Nov. 28, 1967  J. BARRAGAN  3,354,760
PROGRAM-CONTROLLED MACHINE-TOOL SYSTEM
Filed April 12, 1965  2 Sheets-Sheet 1
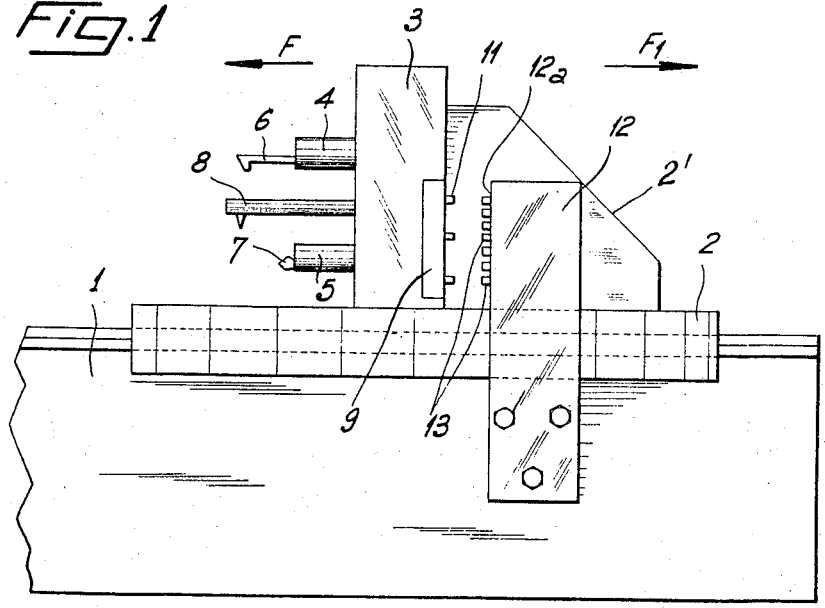
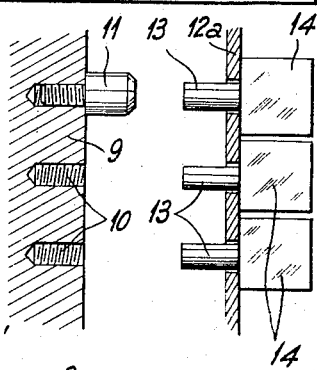
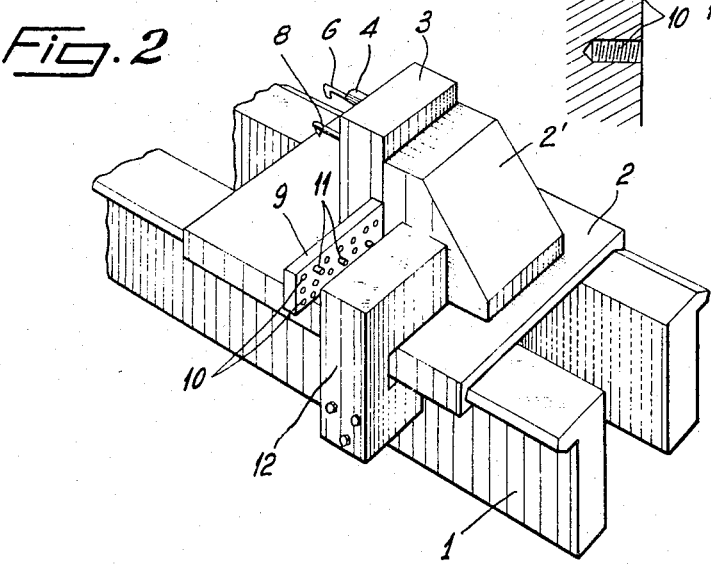
Inventor
Jacques Barragan
By Stevens, Davis, Miller & Mosher
Attorneys Inventor
Jacques Barragan
By Stevens, Davis, Miller + Mosher
Attorneys

United States Patent Office 3,354,760
Patented Nov. 28, 1967

3,354,760
PROGRAM-CONTROLLED MACHINE-TOOL
SYSTEM
Jacques Barragan, 7 Rue Marc Sangnier, Sceaux, France
Filed Apr. 12, 1965, Ser. No. 447,269
Claims priority, application France, Apr. 20, 1964,
971,571
8 Claims. (Cl. 82—2)

ABSTRACT OF THE DISCLOSURE

A machine-tool provided with a fixed array of bistable information storage elements which are selectively operated by projecting members associated with interchangeable tool carrier units in such manner that, before machining, owing to a first contact of a unit with the array, the program of the machine corresponding to said unit is set into said elements and after machining, owing to a second contact, the program is cancelled.

---

A considerable number of different systems have been proposed and are in use for automatically controlling a machine-tool in accordance with a presettable program of machining operations.

One simple and widely-used system applicable to lathes and similar machines having a movable slide involves the provision of stops movable with the slide along the bench of the machine and engageable with presettable switch- or valve-actuating members to command prescribed machining functions at variably determinable positions of the tool relative to the work. The number and variety of different programs that can be preset in this manner is very limited. Another well-known type of system uses a rotatable drum or similar member as the means for storing the command information which determines the machining functions during the cycle. This arrangement permits of presetting more extensively varied programs, but the length of the programmed cycle that can be performed by the machine between manual presetting operations still is limited. Each new cycle requires extensive manual presetting operations, and it is found difficult to achieve perfect synchronism between the initial position of the slide and the initial point of the preset program at each cycle.

More advanced automatic program control systems for machine tools involve the use of a recording medium such as perforate or magnetic tape or the like. Systems of this kind require complex and expensive computer equipment. Moreover, they lack flexibility in that it is not generally possible to modify a part of the program without replacing the entire recorded program.

One defect common to all such prior systems of automatic machine-tool control is that, whereas the details of a given machining cycle are intimately dependent on the nature of the tools employed in machining the work during the cycle, the presetting operations which determine the program during the cycle are in no way tied in with the tooling to be used.

Objects of this invention include the provision of improved means of automatic machine-tool control in accordance with a modifiable program, which will possess all or part of the following main advantages:

Extreme flexibility, through subdivision of a long program of machining operations into partial stages, each of which may involve the use of a separate tool or set of tools;

The choice of tooling to be used in each machining cycle or program stage will automatically determine the detailed machining functions during that cycle or stage;

Facilities for quickly and easily modifying any part of the program for a long and complex machining process without having to change the entire program;

The feasibility of programming a machining process of unlimited length and complexity while using a memory unit of limited information-storage capacity, due to the fact that separate stages of the complete program can be preset on separate units apart from the main memory unit, and that the completion of each stage can reset the common or main memory unit;

The provision of a common positional reference for all the stages of the program whereby precise synchronism will remain assured throughout all the stages of a long machining program.

Other objects will appear. Exemplary embodiments of the invention will now be described for purposes of illustration but not of limitation with reference to the accompanying drawings wherein:

FIG. 1 is a fragmentary view in side elevation showing relevent parts of a machine-tool embodying the invention.

FIG. 2 is a corresponding view in perspective;

FIG. 3 is a fragmentary view in section, showing on an enlarged scale the cooperating, program presetting and program selector means used in the invention;

Figure 4:
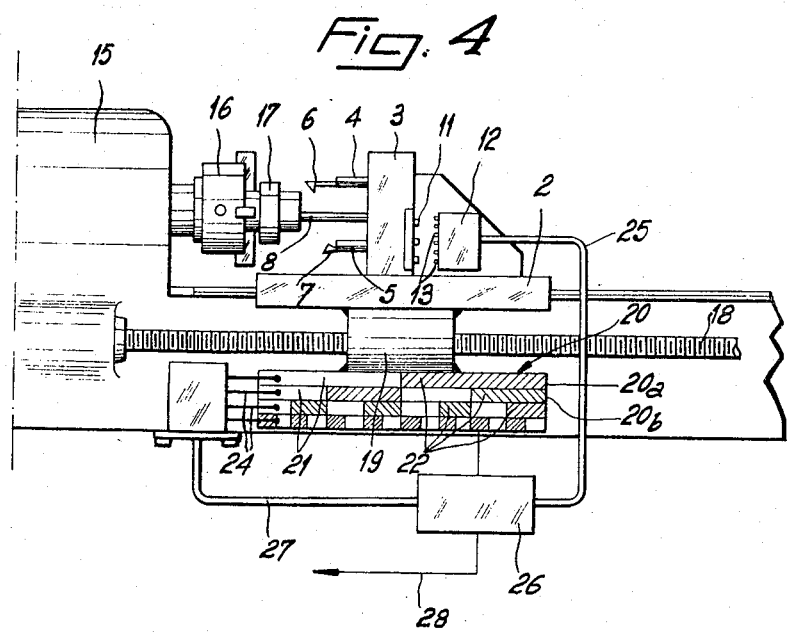
FIG. 4 is a view in side elevation showing a machine-tool similar to that in FIGS. 1–3, further embodying means for generating digital positional signals indicative of the position of the tool carriage relative to the work.

In accordance with an important aspect of the invention, a machine-tool having a displaceable tool support such as a tool carriage or slide, is provided with means for detachably affixing to said tool support a tool carrier unit provided with one or more machining tools. This tool carrier unit may form part of a series including an indefinitely large number of interchangeable such units provided with different tools or different sets of tools thereon. The machine is provided with a memory unit containing a plurality of information storage elements, such as bistable switches, which are presettable to various configurations, each configuration being effective to cause the execution of a corresponding programmed sequence of functions of the machine-tool components during a machining cycle. The memory unit carries an array of setting members the selective operation of which will set the storage elements in the memory unit to a corresponding configuration. These setting members may be depressible switch buttons controlling the on and off conditions of the related bistable switches.

Each tool carrier unit is provided with a set of program selector members, such as pusher members, disposed in a particular pattern. The arrangement is such that when a particular tool carrier unit has been affixed to the tool support or carriage, its set of selector members will act, prior to the start of the machining cycle to be performed with that tool carrier unit, to operate certain among the setting members of the memory unit, in a pattern or positional configuration corresponding to the pattern of the selector members on the particular tool carrier unit considered, thereby to preset the memory unit in accordance with a specific machining program as desired for the machining cycle to be performed with the particular tool carrier unit.

After the machining cycle has been completed, the set of selector members of the tool carrier unit is preferably caused to reengage the array of setting members so as to operate the same setting members of the memory unit as before and thereby reset the memory unit to its initial condition. The tool carrier unit may then be removed from the tool carriage and replaced with another unit of the series for a further machining cycle.

Referring especially to FIG. 1, there is shown a bench 1 of a machine-tool such as an automatic lathe and a slide 2 movable on longitudinal ways thereon and carrying a tool carriage 2'. Supported from the vertical front face of the tool carriage 2', i.e. the face directed towards the lathe spindle and work (not shown), is a tool carrier unit 3, having a plurality of tools projecting from its forwardly directed face. As shown in FIG. 1 by way of example, the unit 3 carries two different tools 6 and 7 removably secured thereto by means of mounts 4 and 5, as well as a reaming bar 8 fixedly supported from unit 3.

It will be understood that the tool carrier unit 3 is detachably secured to the tool carriage 3, and may constitute one of a series of alternative tool carrier units provided in a tool changing appliance and automatically transferrable between said appliance and the tool carriage 3. However this is by no means essential and the tool carrier unit 3 may be adapted to be mounted on carriage 2' by conventional means such as a lathe devolving turret.

Secured to a side of tool carrier unit 3 and projecting laterally therefrom as best seen in FIG. 2 is a rectangular plate 9 having a two-dimensional array of holes 10 formed in its rear surface. The holes 10 are screw threaded and any selected ones among them can receive pusher studs 11 screwed into the holes to project rearwardly therefrom to form a selectively modifiable pattern of projecting actuator stops.

A memory unit 12 includes a rectangular housing fixedly secured to the frame 1 so as to present a vertical surface confronting the perforate rear surface of plate 9, and a two-dimensional array of push-button switch actuators 13 corresponding to the array of perforations 10 in plate 9 project through the front wall of unit 12 for selective depression by the studs 11 inserted in any of said perforations. As indicated in FIG. 3, each of the push-buttons 13 is associated with a respective switch element 14 contained in unit 12. The switch elements 14 are preferably of the bistable type such that consecutive depressions of any one of the push-buttons 13 alternately set and reset the associated switch 14 to its respective stable conditions, such as an "on" and an "off" condition.

It will be understood that the switches 14 are connected in the electrical control circuitry, not shown, of the machine-tool which controls the various parameters of machine-tool operation during each machining cycle in a generally conventional manner. The parameters may include chiefly the length of feed of the tool carriage, rate of feed thereof over different sections of its path, work spindle velocity, as well as other factors such as the possible intervention of one or more cross slides.

Prior to the start of the stage of the machining cycle involving a particular tool carrier unit 3 just mounted on the carriage, a short reverse displacement may be imparted to the carriage along the lathe bench 1 in the direction of arrow F1, whereby the selector pins 11 that have veen provided in a preselected pattern on the plate 9 associated with said tool carrier unit 3 will operate the push-buttons 13 to set the bistable switches 14 to a corresponding configuration of on-off settings. This pattern or configuration of the settings of switches 14 constitutes the program that will command the operation of the machine during the coming machining stage or cycle, i.e. the cycle commencing as the tool carriage 2 reverses its movement over bench 1 and starts advancing in the forward direction of arrow F.

After the machining cycle or stage has been completed, and carriage 2 recedes in the direction of arrow F1, the actuator stops or selector members 11 again operate the setting members 13, depressing precisely the same members 13 of the array which had been depressed by them at the start of the cycle. Since the switch elements 14 are in this embodiment assumed to be of the type in which consecutive depression of the push-buttons thereof alternately switches the elements to each of their respective conditions, it will be evident that the memory unit 12 will thus be reset to its initial state. In other words the information fed into said memory unit at the start of the cycle, is erased at the termination of the cycle.

It will be noted that the position of engagement of the selector pins 11 with the setting members 13 (or engagement of the rear face of plate 9 with the front face 12a of memory unit 12) can desirably serve as an accurate reference position for the tool carriage along the bench 1, defining the origin of the advance movement of the carriage and thus assuring precise synchronism of the machining cycles or stages.

Many of the commands preset in the programming unit 12 by the action of selector pins 11 may be required to be initiated at an accurately prescribed point of the machining cycle as determined by the precise position of slide 2 relative to the work along bench 1.

Means for this purpose are illustrated in FIG. 4, in which the lathe is shown to include, in addition to the parts earlier described and designated by the same numerals as in FIGS. 1–3, a headstock section 15 in which is rotatable a lathe spindle carrying a work-supporting chuck 16 with a workpiece 17 thereon. Further, the lathe is shown as including a conventional leadscrew 18 journalled on a longitudinal axis in bearings supported from a side of the lathe frame, and engaged by a nut, not shown, contained in a bracket 19 secured to a side of the tool carriage 2. This represents a conventional arrangement whereby the leadscrew 18, on being rotated in one or the other sense from power means not shown, usually by way of a variable transmission gear, will cause displacement of tool carriage 2 in the prescribed direction at a prescribed velocity.

Means are provided for coding the position of carriage 2 along its ways by a set of digital electric signals in binary code. For this purpose a coding or digitalizing member 20 in the form of a plate supported from bracket 19 and hence displaceable with the carriage 2 carries a binary coding pattern in the form of four vertically juxtaposed horizontally extending tracks such as 20a and 20b. Each track is composed of an alternating series of electrically conductive and insulating segments of equal length, respectively 21 and 22. In each track the common length of any one of the segments is twice the length of the segments in the track immediately below it. The tracks are engaged by respective conductive feelers or contacts 24 connected in simple circuits with an electric source, not shown, such that for example each feeler 24 will generate a voltage signal on a related output line when the feeler is engaging a conductive segment 21 and will generate a no-voltage signal on said output line when the feeler is engaging an insulating segment 22. All of the output lines are shown grouped in a common cable 27.

The arrangement just described provides a binary positional coder of generally conventional character, and it will be apparent that for any position of tool carriage 2 along its longitudinal path, the output lines 27 will carry a pattern of voltage signals constituting a binary code representation of that position. Obviously the precision or resolution with which the carriage positions are defined by the code signals on lines 27 increases with the number of coder tracks and feelers 24 used, and that number will generally be considerably greater than the number, four, shown in the figure.

The coder output lines 27 are applied to one input of a comparator network 26 which has another input receiving input lines 25 from the memory unit 12. The lines 25 are the output lines of a binary coding section of the memory unit 12, which coding section, not shown, may be formed by a set of the bistable switches 14 interconnected in a conventional binary register array as will be well understood by those familiar with the art, said register having a capacity large enough to accommodate all of the positional counts delivered by coder output lines 27 over the path of displacement of carriage 2. Thus, in the present example where there are four coder strips or tracks 20a, etc., the binary register (not shown) in memory unit 12 would be a four-stage register including four interconnected bistable switches 14. In actual practice there would be considerably more such binary stages.

The logical network 26 may basically constitute a coincidence network including a number (herein four) of two-input and-gates (not shown) each having its inputs connected to one of the (four) lines 27 and a corresponding one of the (four) lines 25, with the outputs of all the and-gates being applied to a multi-input and-gate whose output constitutes the output line 28 of the network 26.

It is believed that the above-described details concerning the positional coder, the binary register section of memory unit 12, and the comparator or coincidence network 26 will be sufficiently clear to anyone familiar with digital control and computation techniques that an illustration of those details may be dispensed with.

As the carriage 2 and with it the coder member 20 move longitudinally of the bench on rotation of the leadscrew 18, the coder output lines 27 emit groups of code signals as produced by the feelers 24 in response to the positions successively traversed. When the code group present on the lines 27 coincides in all of its binary orders with the preset group of signals stored on the memory output lines 25 as previously determined by the pattern of selector pins 11 on the plate 9 associated with the tool carrier unit used in the machining stage under consideration, the coincidence network 26 emits a command signal on line 28, and a prescribed function of the machine-tool, required to be performed at this particular position of the carriage, is carried out. If more than one functions are to be carried out at various positions of the carriage, this can be done by providing as many coincidence networks 26 as there are functions to perform, each circuit having its one input connected to the common coder output 27 and its other input connected to a related binary register included within the memory unit 12.

Figure 5:
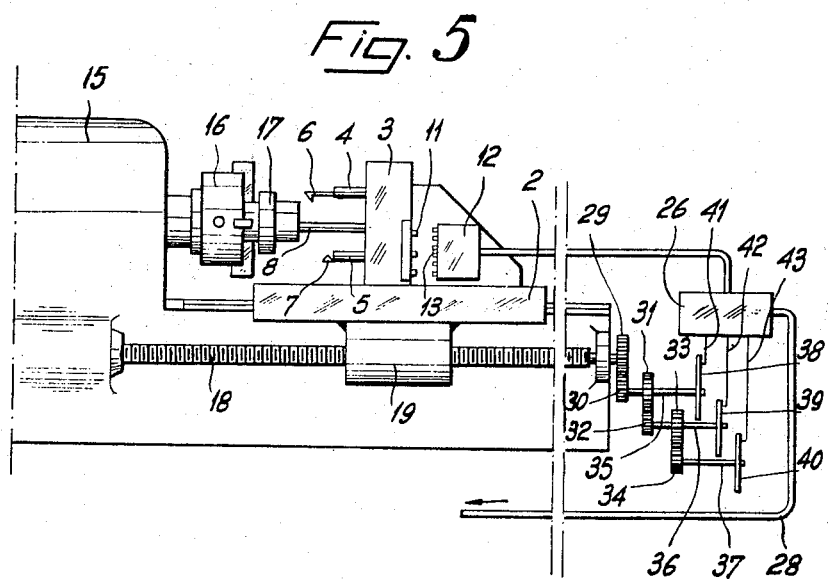
FIG. 5 is similar to FIG. 4 but shows a modified embodiment of the positional signal generating means.

The modification shown in FIG. 5 differs from the one just described in the type of digital coding means used. In this case the leadscrew 18 carries on its rear end a gear 29 which constitutes the input gear to a reducer gearing including the pairs of meshing gears 29–30, 31–32, 33–34, the gears in each pair having diameters in a predetermined ratio, to impart corresponding angular speeds to the respective shafts. Coding discs 38, 39, 40 carried by the respective shafts 35, 36, 37 are scanned by feeler contacts 41, 42, 43 to generate digital code signals which as in the embodiment of FIG. 4 are applied to a coincidence network 26 having its other inputs supplied from a suitable digital register section of the memory unit 12. The coincidence network 26 delivers a command signal over its output 28 when the digital codes applied to the network over both its sets of inputs correspond. The operation of this system is generally similar to that of FIG. 4, but it will be observed that the gear ratios between the three coder shafts can be selected at any desired values, e.g. the ratio ten, if it is desired to indicate the position of carriage 2 directly in units of the metrical system, in which case the digital register means provided in the memory unit 12 may comprise decimal (or binary-decimal) registers.

It will be evident that various other means may be used for digitally coding the position of the carriage 2 along its longitudinal path and thereby determining the precise instant in the machining cycle at which a given command stored in the memory unit 12 is effectively executed or initiated. Thus photo-electric coding or digitizing devices, well-known in the art for indexing a displacement, may be used for the purposes of the invention. The electric pulses derived from the photo-electric scanner of such a device may be applied to a coincidence network similar to network 26 in FIGS. 3 and 4 for comparison with digital signals stored in a register section of the memory unit 12.

It will be apparent from the disclosure that the invention has provided a novel type of programmed machine-tool control which has many and important advantages over conventional such control systems. A basic feature of the invention will be seen to reside in the possibility of subdividing a long and complex program of machining operations into relatively short and simple elementary stages each using a given tool or set of tools, and separately programming each such stage in a separate elementary memory unit (the plate 9 with the selector pins 11) associated with the tooling.

This enormously increases the flexibility of the program. For example, it allows the elementary program for any one stage of the process to be altered as circumstances may demand, without having to throw the entire program overboard (as would usually be the case if the program were recorded on tape or a similar recording medium).

Also, through the use of bistable elements 14 and associated presetting members 13 of the type wherein successive operation (e.g. depression) of a member 13 alternately places the associated bistable element 14 in each of its two stable conditions, as described herein, it is possible on the completion of each elementary stage of the program to erase the information contained in the main memory unit 12 and reset all of the information storage elements 14 therein to zero as described above.

It will be evident that with this arrangement, a main memory unit 12 of very limited storage capacity can serve to control a machining process of unlimited length, the details of which are recorded on the auxiliary elementary memory units constituted by the plates 9 and sets of selector members 11 associated with the tool carrier units. This results in a very great reduction in the amount of digital information-processing equipment required.

Various modifications may be introduced into the embodiment of the invention described and illustrated while remaining within the scope of the invention. Thus, the setting members 13, here shown as push-buttons, may be provided in the form of electrical contacts, mechanically immovable. The selector members 11, instead of being selectively disposable in various patterns in relation to each tool carrier unit 3, may be permanently associated in a fixed pattern in relation to each tool carrier unit. In certain types of machine-tool, wherein the tool support is stationary rather than a displaceable carriage as here shown with reference to a lathe, the memory unit 12 as a whole (or only the array of presetting members 13 thereof) may be made displaceable for operating the setting members from the selector members 11 of the tool carrier unit.

What I claim is:

1. In a program-controlled machine-tool system, the combination comprising:

a machine-tool including a work support and a tool support;

a tool carrier unit affixable to the tool support for performing machining operations on the work in accordance with a selected program;

a variably settable program unit on the machine tool having an array of program-setting members each including a bistable information storage element operable in accordance with any selected one of a variety of positional configurations to set the program unit in accordance with a corresponding one of a variety of machining programs, said array and tool support being relatively displaceable;

and a set of program selector members carried by said tool carrier unit and arranged in a particular positional pattern to operate setting members of said array in accordance with a corresponding positional configuration on relative displacement between said array and tool support, consecutive operation of one setting member alternately placing the corresponding bistable element in each of its stable conditions, whereby the program unit is set in accordance with a corresponding machining program.

2. In a program-controlled machine-tool system the combination comprising:
- a machine-tool including a frame, a work support, and a tool support movable on the frame towards and away from the work support;
- a tool carrier unit affixable to the tool support for machining the work in accordance with a selected program;
- a variably-settable program unit having an array of program-setting members operable in accordance with any selected one of a variety of positional configurations to set the program unit in accordance with a corresponding one of a variety of machining programs;
- said array being fixedly mounted on the machine-tool frame adjacent the path of travel of the tool support and facing towards the work;
- a set of program-selector members carried by said tool carrier unit and arranged in a particular positional pattern;
- said set of program-selector members facing away from the work so as to be engageable with said array as the tool support recedes away from the work and thereby to operate certain setting members of said array in accordance with a positional configuration corresponding to said particular pattern and preset the program unit in accordance with a corresponding machining program.

3. In a program-controlled machine-tool system the combination comprising:
- a machine-tool including a frame, a work support, and a tool support movable on the frame towards and away from the work support;
- a plurality of tool carrier units interchangeably affixable to the tool support prior to the start of different machining cycles for machining the work in accordance with different machining programs;
- a variably-settable program unit having an array of program-presetting members operable in accordance with any selected one of a variety of positional configurations to preset the program unit in accordance with a corresponding one of a plurality of machining programs;
- said array being fixedly mounted on the machine-tool frame adjacent the path of travel of the tool support and facing towards the work;
- a set of program-selector members carried by each of said tool carrier units and arranged in different positional patterns;
- said set of program-selector members facing away from the work when the related tool carrier unit is affixed to the tool support so as to be engageable with said array as the tool support recedes away from the work prior to the start of a machining cycle whereby to operate certain setting members of said array in accordance with a positional configuration corresponding to the particular pattern of program-selector members provided on the tool carrier unit affixed to the tool support, and preset the program unit for the performance of a machining cycle corresponding to the particular tool carrier unit.

4. The combination defined in claim 3, wherein each of the program-presetting members is alternately operable to a set and a reset condition on consecutive operation thereof, and said set of selector members is reengageable with said array of setting members as the tool support recedes from the work on termination of the machining cycle whereby to reset the memory unit to its prior condition.

5. In a program-controlled machine-tool system the combination comprising:
- a machine-tool including a work support and a tool support;
- tool carrier units interchangeably affixable to the tool support prior to the start of different machining cycles for machining the work in accordance with different machining programs;
- a variably settable program unit on the machine-tool having an array of program-setting members operable in accordance with any selected one of a variety of positional configurations to preset the program unit in accordance with a corresponding one of a plurality of machining programs, each setting member being alternately operable to a set and a reset condition on consecutive operation thereof;
- a set of program-selector members carried by each of said tool carrier units and arranged in different positional patterns to selectively operate selected setting members of said array in accordance with a corresponding positional configuration on engagement between said set and said array;
- said array and tool support being relatively displaceable to effect a first engagement of said set and said array at the start of a machining cycle and another engagement of said set and array on completion of a machining cycle; whereby the partciular tool carrier unit affixed to the tool support prior to the start of a machining cycle will preset said program unit in accordance with a particular program and will reset said program unit to its prior condition on completion of the cycle.

6. The combination defined in claim 2, wherein the program unit has information-storage means therein for presetting digital information indicative of a prescribed position of the tool support relative to the work, and there is provided positional coding means associated with the tool support for generating digital code signals indicative of the actual position of the tool support relative to the work, and means responsive to coincidence between the digital code signal generated by the positional coding means and the digital information preset in the program unit for delivering a command signal to perform a prescribed action in said machining process.

7. The combination defined in claim 6, wherein said information storage means comprises a plurality of bistable elements, said positional coding means generates binary code signals and said coincidence responsive means comprises a logical coincidence circuit.

8. The combination defined in claim 6, wherein said tool carrier unit is one of a series of such units interchangeably affixable to the tool support.

References Cited
UNITED STATES PATENTS

| | | | |
|---|---|---|---|
| 2,911,868 | 11/1959 | Thomson | 82—2 |
| 3,143,900 | 8/1966 | Oeckl et al. | 77—67 X |

WILLIAM W. DYER, JR., *Primary Examiner.*

LEONIDAS VLACHOS, *Examiner.*